(12) United States Patent
Fredette et al.

(10) Patent No.: US 7,131,210 B2
(45) Date of Patent: Nov. 7, 2006

(54) BOREHOLE CALIPER TOOL

(75) Inventors: Mark A. Fredette, Houston, TX (US);
Scott Ritter, Missouri City, TX (US);
Wade D. DuPree, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/711,686

(22) Filed: Sep. 30, 2004

(65) Prior Publication Data

US 2006/0064889 A1    Mar. 30, 2006

(51) Int. Cl.
*G01B 5/12* (2006.01)
*E21B 47/08* (2006.01)

(52) U.S. Cl. .................................................. 33/544
(58) Field of Classification Search ............. 33/544, 33/542, 544.2, 544.3, 555.1, 555.4
See application file for complete search history.

(56) References Cited

U.S. PATENT DOCUMENTS

| | | | |
|---|---|---|---|
| 2,639,512 A | 5/1953 | Legrand | |
| 2,771,686 A | 11/1956 | Hamontre et al. | |
| 2,829,441 A * | 4/1958 | Bagnell | 33/544.3 |
| 2,899,633 A * | 8/1959 | Smith et al. | 33/544.3 |
| 2,946,130 A * | 7/1960 | Groner et al. | 33/544.3 |
| 3,023,508 A | 3/1962 | Saurenman | |
| 3,060,588 A | 10/1962 | Lanmon, II et al. | |
| 3,349,498 A | 10/1967 | Oliver et al. | |
| 3,685,158 A | 8/1972 | Planche | |
| 4,083,237 A | 4/1978 | Levesque | |
| 4,251,773 A | 2/1981 | Cailliau et al. | |
| 4,251,921 A | 2/1981 | Fink | |
| 4,407,157 A | 10/1983 | Lichtenberg | |
| 4,432,143 A | 2/1984 | Moriarty et al. | |
| 4,480,186 A | 10/1984 | Wolk | |
| 4,673,890 A | 6/1987 | Copland et al. | |
| 4,914,826 A | 4/1990 | Nold, III | |
| 4,926,937 A | 5/1990 | Hademenos | |
| 4,979,585 A | 12/1990 | Chesnutt | |
| 5,086,645 A | 2/1992 | Deaton | |
| 5,092,056 A * | 3/1992 | Deaton | 33/544 |
| 5,299,359 A | 4/1994 | Estes et al. | |
| 5,531,112 A | 7/1996 | Young et al. | |
| 5,548,900 A * | 8/1996 | Hunt-Grubbe | 33/544 |
| 5,631,413 A | 5/1997 | Young et al. | |
| 6,339,886 B1 | 1/2002 | Reinhardt | |
| 6,560,889 B1 | 5/2003 | Lechen | |
| 6,588,542 B1 | 7/2003 | Nakajima et al. | |
| 6,647,637 B1 | 11/2003 | Lechen | |
| 6,702,010 B1 | 3/2004 | Yuratich et al. | |
| 6,848,189 B1 * | 2/2005 | Moake et al. | 33/544 |

* cited by examiner

*Primary Examiner*—Christopher W. Fulton
(74) *Attorney, Agent, or Firm*—Victor H. Segura; Brigitte L. Echols

(57) ABSTRACT

A borehole caliper tool includes a tool body and an arm coupled to the tool body. The arm is deflectable relative to the tool body. The caliper tool further includes a cam coupled to the arm such that a position of the cam changes as the arm deflects. The caliper tool further includes a proximity sensor for sensing the position of the cam, wherein the position of the cam provides an indication of the deflection of the arm relative to the tool body.

9 Claims, 5 Drawing Sheets

BOREHOLE CALIPER TOOL

BACKGROUND OF INVENTION

Various caliper tools for gauging the diameter of a borehole are known in the art. In one example, a caliper tool includes one or more bow springs coupled to a tool body. When the tool body is disposed in a borehole, the bow spring engages the borehole wall. The bow spring flexes as the tool body traverses the borehole and the borehole diameter changes. The motion of the bow spring can provide an indication of the borehole diameter. In this case, a sensing device can be attached to the bow spring and used to monitor the motion of the bow spring. This is taught, for example, in U.S. Pat. No. 2,639,512. Some caliper tools further include one or more rigid arms coupled between the tool body and the bow spring. The rigid arm deflects as the bow spring flexes, and the motion of the rigid arm provides an indication of the borehole diameter.

An electronic sensing device having a movable part is usually used to monitor the motion of the rigid arm. Typical examples of these electronic sensing devices include linear variable differential transformer (LVDT) and potentiometer sensors. An LVDT sensor includes a ferromagnetic core disposed within a series of inductors and produces electrical output proportional to the physical position of the ferromagnetic core within the series of inductors. A potentiometer sensor includes a slider attached to a resistor and produces electrical output proportional to the contact position of the slider on the resistor. The caliper tool uses a mechanical linkage to couple the movable part of the sensing device to the rigid arm so that the electrical output generated by the sensing device is representative of the motion, or deflection, of the rigid arm.

The mechanical linkage is required to satisfy various requirements. For example, the mechanical linkage is required to fit in a small space on the tool body and work in the hydrostatic pressure of the borehole, which frequently exceeds 20,000 psi (138 MPa), and in the presence of drilling mud, which typically contains debris. The mechanical linkage must be mechanically tight to avoid introducing errors in translating the position of the rigid arm to the sensing device. To allow attachment to the mechanical linkage, the movable part of the sensing device would either have to be exposed to borehole pressure and drilling fluid or be located in a compensator filled with oil at borehole pressure.

As evident from conventional configurations, physically linking the sensing device to a rigid arm complicates the design and operation of a caliper tool. A caliper tool that does not require a mechanical linkage to translate motion of an arm to a sensing device is desired.

SUMMARY OF INVENTION

In one aspect, the invention provides a borehole caliper tool. The tool including a tool body; an arm coupled to the tool body, the arm being deflectable relative to the tool body; a cam coupled to the arm such that a position of the cam changes as the arm deflects; and a proximity sensor for sensing the position of the cam, wherein the position of the cam provides an indication of the deflection of the arm relative to the tool body.

In another aspect, the invention provides a borehole caliper tool. The tool includes a tool body; an arm having a first and second end, the arm being coupled to the tool body at the first end to form a pivot joint; a cam coupled to the arm at the first end, the cam adapted to move as the arm moves relative to the tool body; and a proximity sensor adapted to sense the position of the cam, wherein the position of the cam provides an indication of the movement of the arm relative to the tool body.

In another aspect, the invention provides a method for gauging a diameter of a borehole. The method includes deploying a tool body carrying an arm assembly in the borehole, the arm assembly comprising an arm extending between a surface of the borehole and the tool body and deflectable relative to the tool body as the diameter of the borehole changes, the arm having a cam coupled thereto such that a position of the cam changes as the arm deflects; monitoring the position of the cam using a proximity sensor; and translating the position of the cam into the diameter of the borehole.

DETAILED DESCRIPTION OF PREFERRED EMBODIMENTS

In the following description, numerous specific details are set forth in order to provide a thorough understanding of the invention. However, it will be apparent to one skilled in the art that the invention may be practiced without some or all of these specific details. In other instances, well-known features and/or process steps have not been described in great detail in order to avoid obscuring the invention. The features and advantages of the invention may be better understood with reference to the drawings and discussions that follow.

Figure 1A:
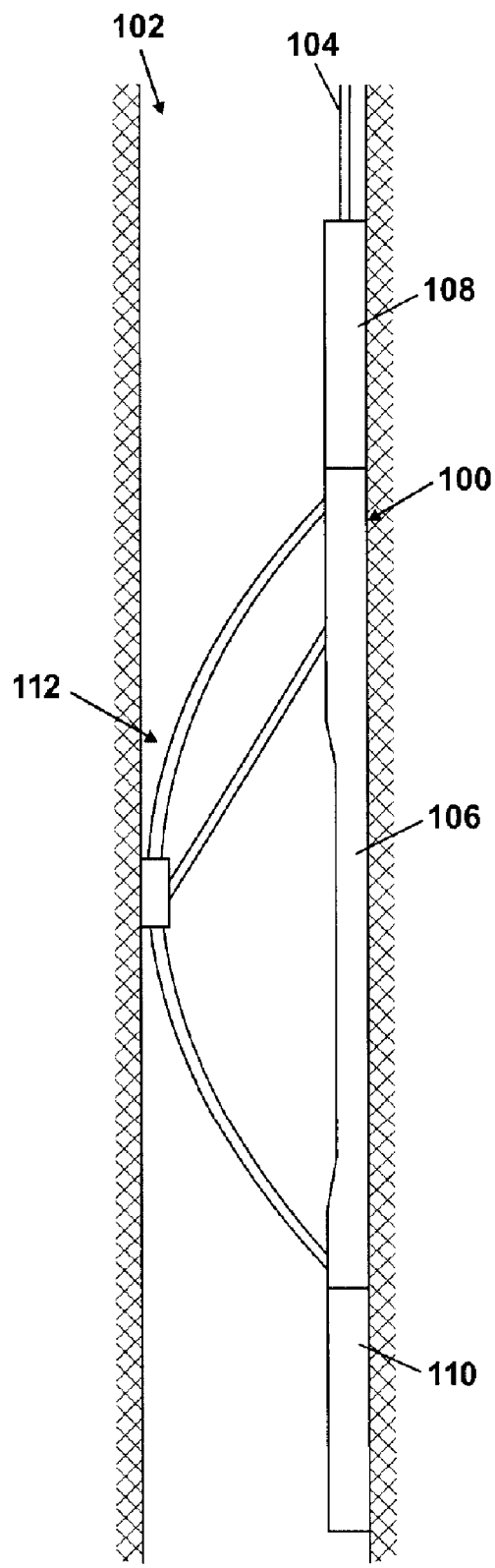
FIG. 1A shows a caliper tool according to one embodiment of the invention in a borehole.

FIG. 1A shows a caliper tool 100 according to an embodiment of the invention deployed in a borehole 102. The caliper tool 100 measures and logs the diameter of the borehole 102 as it traverses the borehole 102. In FIG. 1A, the caliper tool 100 is suspended in the borehole 102 on the end of a logging cable 104. Alternatively, the caliper tool 100 could form a part of a downhole tool (not shown) that performs other downhole operations besides gauging the diameter of the borehole 102. The caliper tool 100 includes an elongated tool body 106 attached between an upper body 108 and a lower body 110. The upper body 108 and the lower body 110 may include the circuitry needed to record caliper tool measurements and transmit the measurements to the surface. The tool body 106 carries an arm assembly 112, which expands and contracts as the caliper tool 100 traverses the borehole 102. The motion of the arm assembly 112 is tracked to determine the diameter of the borehole 102.

Figure 1B:
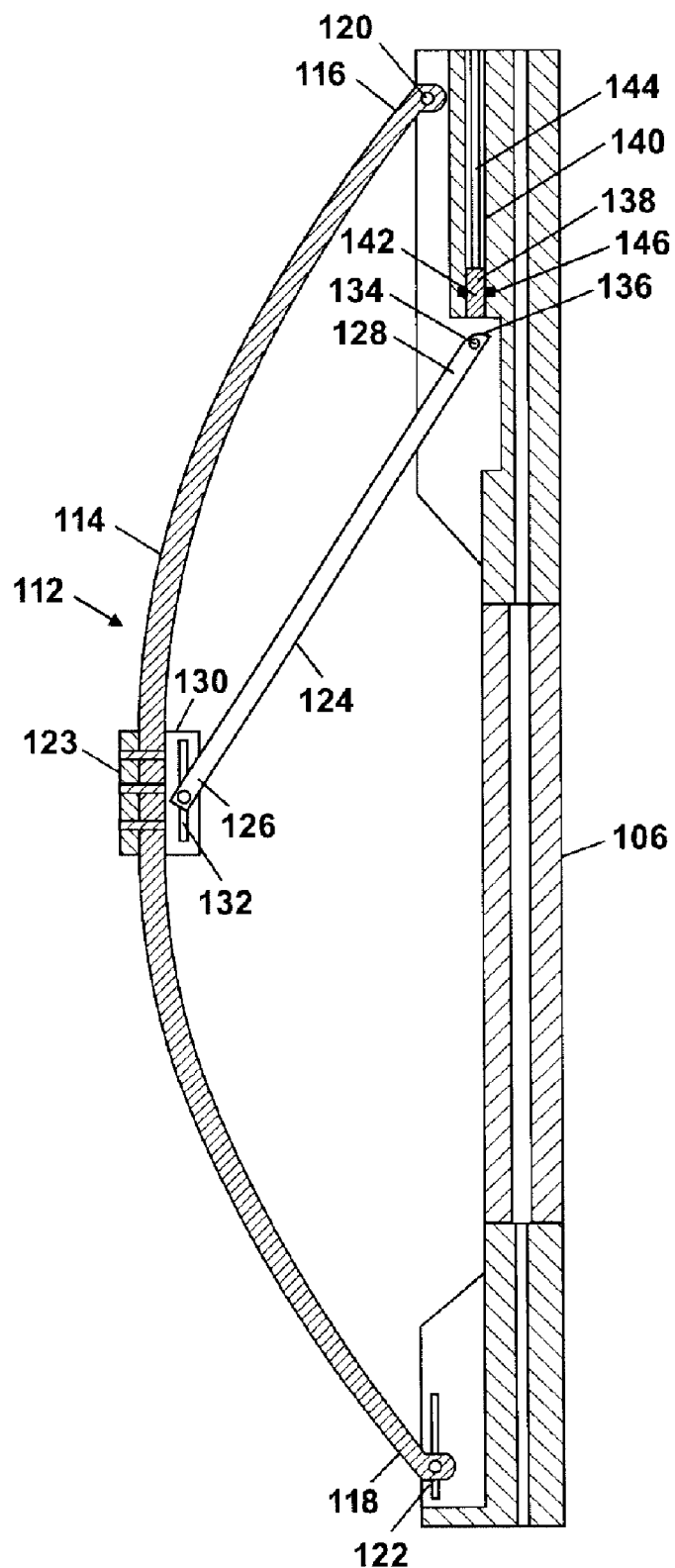
FIG. 1B shows a cross-section of the caliper tool of FIG. 1A according to one embodiment of the invention.

FIG. 1B shows a cross-sectional view of the tool body 106 and the arm assembly 112. The arm assembly 112 includes a bow spring 114 having ends 116, 118 coupled to the tool body 106 by joints 120, 122, respectively. The invention is not limited by how the joints 120, 122 are implemented, but the joints should allow pivoting of the bow spring ends 116, 118 relative to the tool body 106. In the illustrated embodiment, joint 120 is shown as a pin-in-hole joint, while joint 122 is shown as a pin-in-slot joint. Both the (pin-in-hole) joint 120 and the (pin-in-slot) joint 122 allow pivoting of the bow spring ends 116, 118. In addition, the (pin-in-slot) joint 122 allows sliding of the bow spring end 118 along the tool body 106. In this way, the bow spring 114 can expand and contract as the tool body 106 and arm assembly 112 traverses the borehole. A pad 123 is attached to the middle portion of the bow spring 114 for engaging the borehole (102 in FIG. 1A) wall. The pad 123 provides a flat reference surface from which the borehole diameter can be measured.

The arm assembly 112 further includes a rigid follower arm 124 having an end 126 coupled to the bow spring 114 and an end 128 coupled to the tool body 106. A pad 130 attached to the middle portion of the bow spring 114, opposite the pad 123, couples the end 126 of the follower arm 124 to the middle portion of the bow spring 114. The pad 130 includes a slot which cooperates with a pin on the end 126 of the follower arm 124 to form a pin-in-slot joint 132. The joint 132 allows the end 126 to both slide and pivot relative to the bow spring 114. The end 128 of the follower arm 124 is coupled to the tool body 106 via a joint 134, which preferably allows pivoting of the end 128. The end 128 of the follower arm 124 includes a cam 136. The mass of the cam 136 is displaced as the bow spring 114 flexes and the follower arm 124 deflects. The motion of the cam 136 is monitored and used as an indication of the diameter of the borehole (102 in FIG. 1A).

A proximity sensor 138 tracks the motion of the cam 136 without being physically linked to the cam 136. The proximity sensor 138 is installed in a cavity 140 in the tool body 106. The proximity sensor 138 includes a sensor end 142 and an electrical connector 144. In one embodiment, the sensor end 142 is exposed to the hydrostatic pressure in the borehole (102 in FIG. 1A), while the electrical connector 144 is sealed inside the cavity 140 at atmospheric pressure. The seal can be made between the outer surface of the sensor end 142 and the inner surface of the cavity 140 as shown at 146. The electrical connector 144 is linked to the upper body (108 in FIG. 1A), which includes the circuitry for making caliper measurements. If the sensor end 142 is exposed to the hydrostatic pressure in the borehole, the sensor end 142 must be able to withstand high pressures, e.g., 9,000 psi. The sensor end 142 should also be made of a material that can withstand high temperatures and that is resistant to corrosion.

In one embodiment, the proximity sensor 138 is a non-contact differential variable reluctance transducer (DVRT), such as available from MicroStrain Inc., Burlington, Vt., under the trade name Non-Contact DVRT®, and Kaman Aerospace Corporation, Colorado Springs. A non-contact DVRT sensor transmits a high frequency electromagnetic signal to determine the distance from a ferrous or conductive target. The Non-Contact DVRT® sensor from MicroStrain includes a sense and a compensation coil disposed in a stainless steel housing. The reluctance of the sense coil changes when a ferrous or highly conductive target is brought into proximity with the face of the sensor, while the compensation coil acts as a reference. The sense and compensation coils are driven by a high frequency sinewave excitation, and their differential reluctance is measured using a sensitive demodulator.

When the proximity sensor 138 is a non-contact DVRT such as described above, the cam 136 should be formed of a conductive or magnetic material. Thus, as the follower arm 124 deflects due to expansion and contraction of the bow spring 114, the cam 136 rotates and reluctance of the proximity sensor 138 changes in response to the moving mass of the cam 136. The sensitivity of the non-contact DVRT sensor is unaffected by non-ferrous, non-conductive materials interposed between the sensor face and the cam. However, because the non-contact DVRT sensor will be used in the presence of (salty) water, which is conductive, the cam 136 is preferably made of a very high conductivity or very high conductivity and (magnetic) permeability material in order to minimize the effect of the salty water. With a conductivity over 4 orders of magnitude greater than the saltiest water, 316 Stainless steel is an example of a material that is suitable for use as cam material. Once the cam material is selected, the output sensitivity of the non-contact DVRT sensor can be tuned for the selected cam material.

Figure 1C:
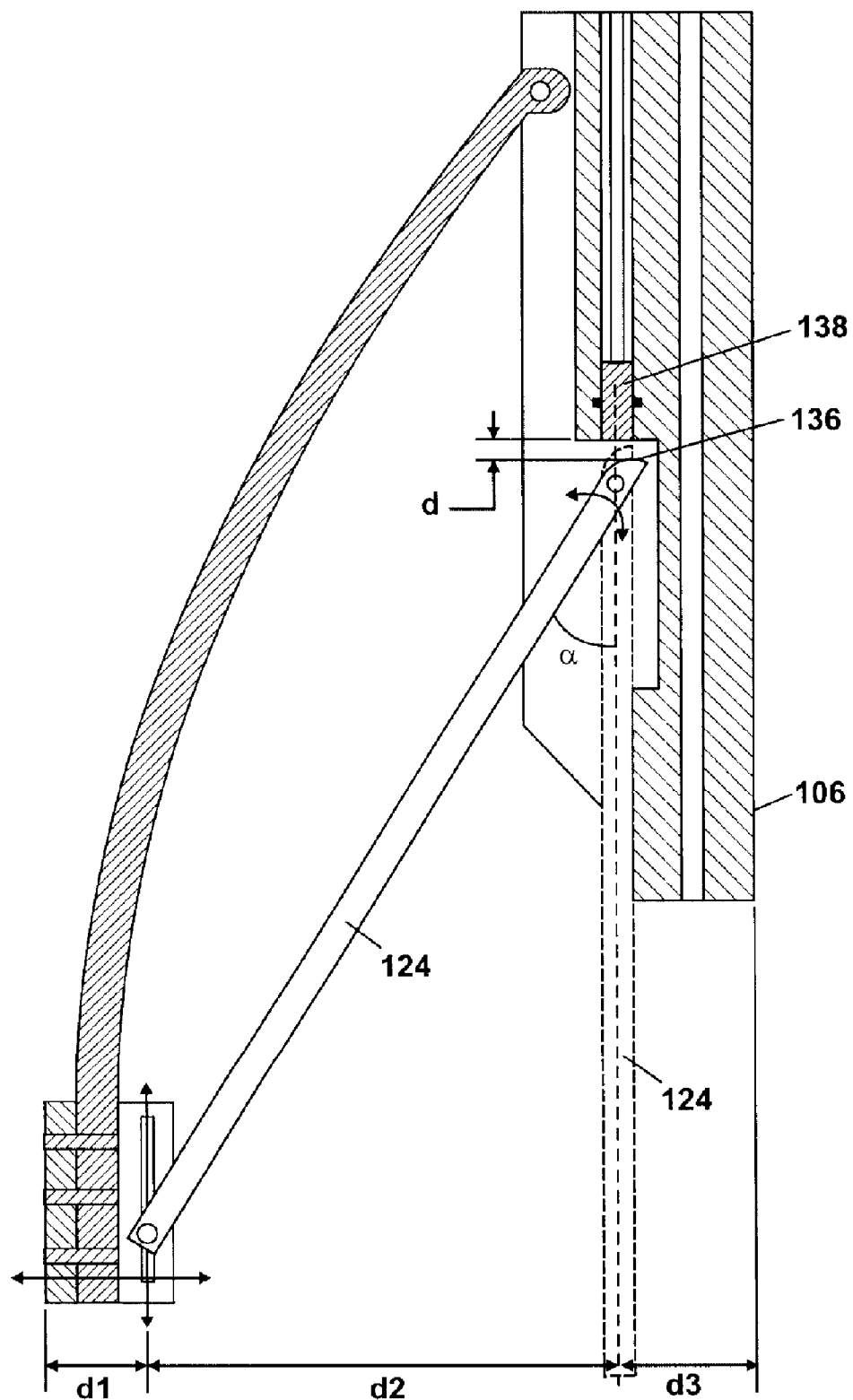
FIG. 1C is a schematic diagram illustrating certain operation principles of one embodiment of the invention.
Figure 2:
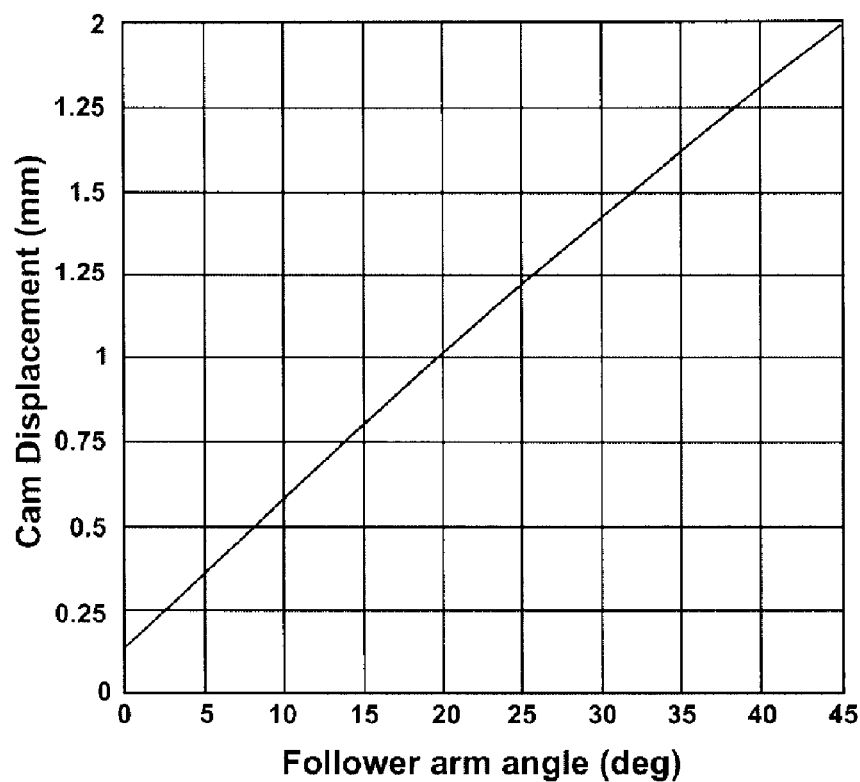
FIG. 2 shows a relationship between cam displacement and follower arm angle according to one embodiment of the invention.

FIG. 1C shows the follower arm 124 including the cam 136 and the proximity sensor 138 positioned proximate but not physically linked to the cam 136. As the follower arm 124 deflects away from the tool body 106, the angle, $\alpha$, between the follower arm 124 and the tool body 106 increases, and the mass of the cam 136 moves away from the proximity sensor 138. As the follower arm 124 deflects towards the tool body 106, the angle, $\alpha$, between the follower arm 124 and tool body 106 decreases, and the mass of the cam 136 moves towards the proximity sensor 138. The proximity sensor 138 measures the distance, d, between the cam 136 surface and the proximity sensor 138 as the mass of the cam 136 is displaced. FIG. 2 shows a relationship between the cam displacement (d) and the follower arm angle ($\alpha$) for the cam shape shown in FIG. 1C. Returning to FIG. 1C, the borehole diameter is a sum of the lengths d1, d2, and d3. Lengths d1 and d3 are fixed while length d2 changes. In operation, the cam displacement (d) is measured using the proximity sensor 138. Then a relationship such as shown in FIG. 2 is used to determine the follower arm angle ($\alpha$). The follower arm angle ($\alpha$) together with the length of the follower arm 124 can be used to determine length d2.

Figure 3:
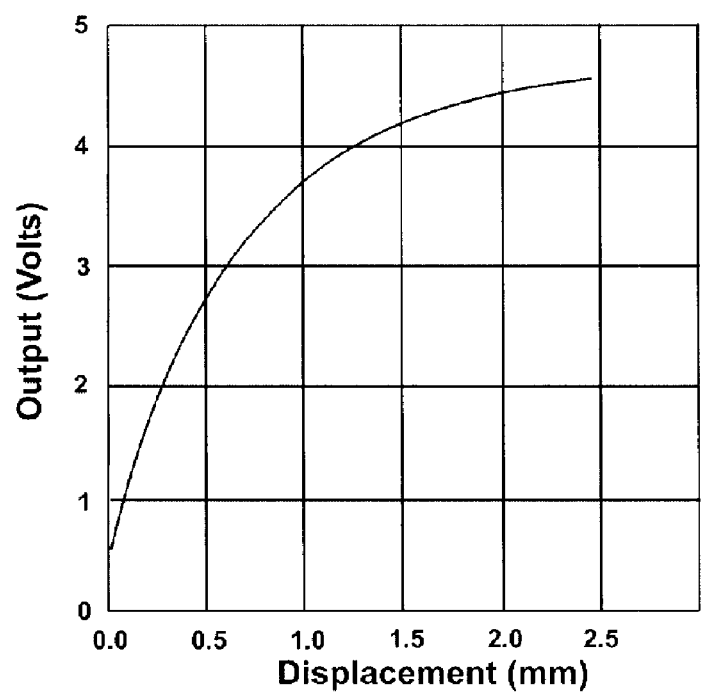
FIG. 3 shows a displacement output of a non-contact DVRT sensor.

In one embodiment, a caliper measurement error less or equal to ±0.1 in. (2.54 mm) is desired. For this error limit, the follower arm angle ($\alpha$) should be known within ±0.33°. For the relationship shown in FIG. 2, this corresponds to measuring the cam displacement (d) within ±12.7 µm. To achieve this cam displacement accuracy, the mechanical slop in the follower arm and cam relative to the proximity sensor is preferably less than 5.1 µm. The inventors have verified the manufacturer's claim that the Non-Contact DVRT® sensor is capable of measuring 0.25 µm movement of a metal target at distances up to 2.5 mm from the face of the sensor. The displacement signal output from the Non-Contact DVRT® sensor is shown in FIG. 3. A polynomial curve fit to the non-linear response yields the desired accuracy. It will be understood by those skilled in the art that the invention is not limited to this particular non-contact DVRT sensor. The invention is also not limited to the cam shape shown in FIG. 1C. The cam shape can be modified from that shown in FIG. 1C to provide a larger range of displacement or to increase the output sensitivity of the sensor.

Figure 4:
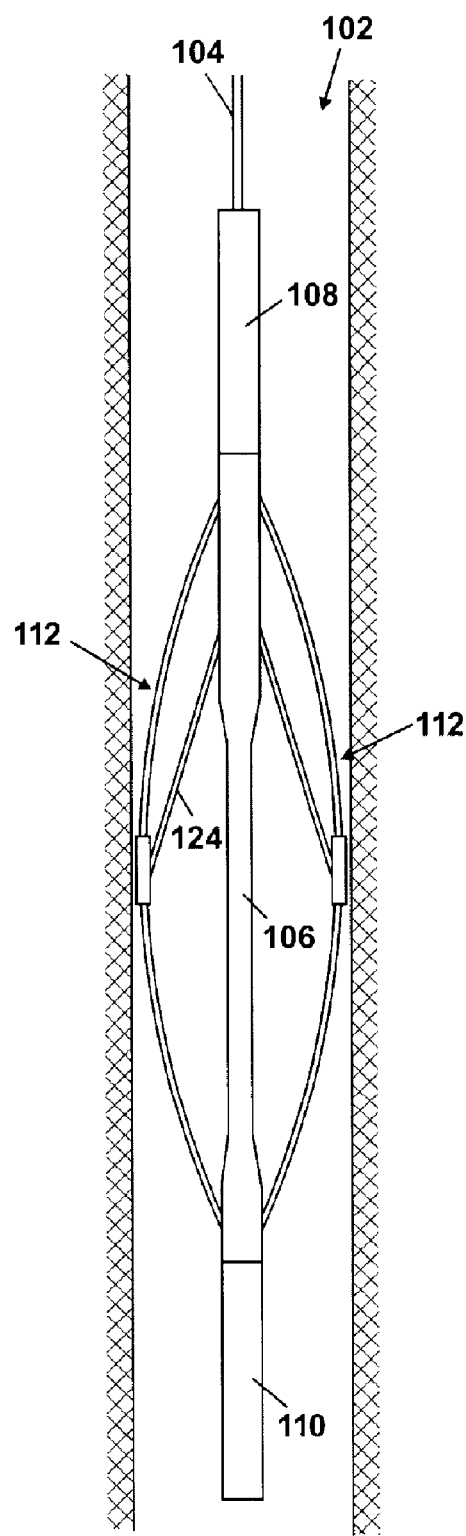
FIG. 4 shows a caliper tool having a plurality of arm assemblies according to another embodiment of the invention.

In the embodiment shown in FIG. 1A, a single caliper arm assembly 112 is coupled to the tool body 106. Thus, the tool body 106 and the arm assembly 112 make contact with the borehole 102 wall, and the diameter of the borehole 102 is the distance from the outer edge of the arm assembly 112 to the outer edge of the tool body 106. In alternate embodiments, as shown in FIG. 4, a plurality of arm assemblies 112 may be coupled to the tool body 106. The arm assemblies 112 may be distributed about the diameter of the tool body 106 such that the tool body 106 is centered within the borehole 102 while the diameter measurements are being made. A proximity sensor (not shown) would be provided to track the motion of each cam (not shown) coupled to each follower arm 124 included in the arm assemblies 112 as previously described. Each proximity sensor would enable measurement of the distance from the center of the tool body 106 to the surface of the borehole 102, and the results can be integrated to determine the overall diameter of the borehole 102. The proximity sensor is not limited to a non-contact DVRT sensor. Other proximity sensors capable of operating in a borehole environment can also be used.

While the invention has been described with respect to a limited number of embodiments, those skilled in the art, having benefit of this disclosure, will appreciate that other embodiments can be devised which do not depart from the scope of the invention as disclosed herein. For the purposes of this specification it will be clearly understood that the word "comprising" means "including but not limited to", and that the word "comprises" has a corresponding meaning.

What is claimed is:

1. A borehole caliper tool, comprising:
   a tool body;
   a pad for engagement with a surface of the borehole;
   a proximity sensor; and
   a follower arm having a first and second end, the follower arm being coupled to the tool body at the first end to form a pivot joint defining a cam proximate thereto, with the second end being pivotally coupled to the pad, the cam having mass and being coupled to reciprocate about the pivot joint to facilitate a displacement of the mass with respect to the proximity sensor in response to contact of the pad with the surface, with the proximity sensor being positioned to sense the displacement of the mass and generate an output containing information concerning the deflection of the follower arm relative to the tool body.

2. The borehole caliper tool of claim 1, further comprising a bow spring coupled to the tool body and the pad.

3. The borehole caliper tool of claim 2, wherein the bow spring includes opposed ends coupled to the tool body, with the pad being coupled to the bow spring equidistant from the opposite ends.

4. The borehole caliper tool of claim 2, wherein the arm is coupled to the bow spring at the second end and adapted to move as the bow spring flexes.

5. The borehole caliper tool of claim 4, wherein a sliding pivot joint is formed between the second end and the bow spring.

6. The borehole caliper tool of claim 1, wherein the proximity sensor is a non-contact differential variable reluctance transducer.

7. The borehole caliper tool of claim 1, which comprises an additional follower arm and an additional proximity sensor with said follower arm and said additional follower arm defining a plurality of proximity sensor and said additional proximity sensor defining a plurality of proximity sensors with each of the plurality of follower arms being coupled to the tool body and having a cam and each of the plurality of proximity sensors positioned to sense displacement of the cam associated with one of said plurality of follower arms.

8. The borehole caliper tool of claim 7, wherein the plurality of follower arms and proximity sensors are distributed about a diameter of the tool body.

9. The borehole caliper tool of claim 1, wherein the arm is rigid.

* * * * *